US012728368B2

(12) United States Patent
O'Gorman et al.

(10) Patent No.: US 12,728,368 B2
(45) Date of Patent: Sep. 8, 2026

(54) METHOD AND APPARATUS FOR INDUSTRIAL PRODUCTION OF AN EXTRACT BY SOLID-LIQUID EXTRACTION

(71) Applicant: GEA TDS GmbH, Sarstedt (DE)

(72) Inventors: Colm O'Gorman, Royston (GB); Ulrich Rolle, Everswinkel (DE); Maria Carmen Leal Garcia, Muenster (DE); Ludger Tacke, Velen (DE); Franz-Josef Helms, Sarstedt (DE)

(73) Assignee: GEA TDS GmbH, Sarstedt (DE)

(*) Notice: Subject to any disclaimer, the term of this patent is extended or adjusted under 35 U.S.C. 154(b) by 1138 days.

(21) Appl. No.: 17/604,663

(22) PCT Filed: Feb. 26, 2020

(86) PCT No.: PCT/EP2020/000051
§ 371 (c)(1),
(2) Date: Oct. 18, 2021

(87) PCT Pub. No.: WO2020/211972
PCT Pub. Date: Oct. 22, 2020

(65) Prior Publication Data

US 2022/0258069 A1 Aug. 18, 2022

(30) Foreign Application Priority Data

Apr. 17, 2019 (DE) ..................... 10 2019 002 807.4

(51) Int. Cl.
*B01D 11/02* (2006.01)

(52) U.S. Cl.
CPC ...... *B01D 11/0273* (2013.01); *B01D 11/0207* (2013.01); *B01D 11/0253* (2013.01); *B01D 11/028* (2013.01)

(58) Field of Classification Search
CPC ............ B01D 11/0273; B01D 11/0207; B01D 11/0253; B01D 11/028; B01D 11/0219;
(Continued)

(56) References Cited

U.S. PATENT DOCUMENTS 5,153,015 A 10/1992 Theissing et al.
2018/0368612 A1* 12/2018 Stein ...................... A47J 31/52

FOREIGN PATENT DOCUMENTS

CN 106563288 A 4/2017
CN 207532831 U * 6/2018
(Continued)

OTHER PUBLICATIONS

Li, W. CN207532831U—translated document (Year: 2018).*
(Continued)

*Primary Examiner* — Erik Kashnikow
*Assistant Examiner* — Janice Y Silverman

(57) ABSTRACT

The industrial production of an extract by means of solid-liquid extraction improves the exchange of substances during extraction and allows enhanced dehumidification of a raffinate with residual moisture to obtain additional valuable extract. The extraction is enhanced during a first dwell time by at least one of at least partially flooding a vessel in the form of at least one flow discharged in a planned and targeted manner with a secondary solvent or the obtained extract, swirling and keeping in suspension the primary mixture within the vessel by supplying the secondary solvent or the obtained extract via a foot area of the vessel through an upwardly directed fourth flow, or moving the vessel relative to the extraction container within the obtained extract; circulating the secondary solvent or the extract in the extraction container by a circulation guide incorporating the extraction container from top to bottom relative to the extraction container; and supplying the extract freed from
(Continued)

raffinate with residual moisture obtained by dehumidification to the already separated or to be separated extract freed from raffinate with residual moisture.

9 Claims, 3 Drawing Sheets

(58) Field of Classification Search
CPC ........ B01D 11/0269; A23F 3/18; A23F 3/423; A23F 3/16; A23F 3/20
See application file for complete search history.

(56) References Cited

FOREIGN PATENT DOCUMENTS

| | | | | |
|---|---|---|---|---|
| CN | 108654137 | A | 10/2018 | |
| CN | 208115208 | U | 11/2018 | |
| DE | 699 29 220 | T2 | 8/2006 | |
| DE | 10 2013 022 271 | A1 | 9/2014 | |
| EP | 1174145 | A2 * | 1/2002 | ......... B01D 11/0257 |
| EP | 2 837 290 | A1 | 2/2015 | |
| JP | H08112205 | A * | 5/1996 | |
| NO | 308939 | B1 | 11/2000 | |
| WO | 00/19833 | A2 | 4/2000 | |
| WO | 2011/046745 | A1 | 4/2011 | |

OTHER PUBLICATIONS

Ahmad Tea . How to brew a perfect cup of tea with teabags, by Tea Taster Dominic Marriott Video from Nov. 14, 2015 from URL: https://www.youtube.com/watch?v=Y-kx8JEDgnE, with screenshots. (Year: 2015).*

Bindes et al. Journal of Food Engineering 241 (2019) 97-104. (Year: 2019).*

Themptylounge. Having fun making coffee—Hario Sommelier Video from May 5, 2015 from URL: <https://www.youtube.com/watch?v=uqFTRdWcNoY>. Obtained on Sep. 10, 2025. (Year: 2015).*

Daily Coffee News. Obtained from URL: <https://dailycoffeenews.com/2019/05/01/with-new-commercial-machine-curtis-gets-to-the-essence-of-cold-brew/. Obtained on Sep. 10, 2025. (Year: 2019).*

* cited by examiner

"E-F"
23
23a
23b
S3
12; 12.1
(C∞B)**
C
(A∞B)
25 (S4)
25a (S4)

10
12; 12.1
R
R1
R2
T1

D1
D2
H
S
T1
R1
12.1a
12.1
12.1b 100
12; 121
r
S
T1
T2
R1

METHOD AND APPARATUS FOR INDUSTRIAL PRODUCTION OF AN EXTRACT BY SOLID-LIQUID EXTRACTION

TECHNICAL FIELD

The invention relates to a method and a device for the industrial production of an extract by means of solid-liquid extraction, preferably by means of solid-liquid hot extraction, and in particular for large-scale applications, using an extraction container.

BACKGROUND

Methods of traditional tea production have been known for quite a while; they are however not or only slightly suitable for industrial or semi-industrial production of a tea concentrate or a tea beverage on an industrial scale because they meet their limits due to the physical circumstances.

The generic features of the method according to the invention are disclosed in WO 2011/046 745 A1. It describes a brewing system and a method for brewing tea, and in particular a system and a method for brewing highly concentrated tea. The brewing system comprises a fixedly arranged brewing chamber in a tea brewing pot that are supplied a dose of tea leaves and hot water from a hot water source. The brewing chamber can contain a plunger as a bottom limit that can be moved up and down within the brewing chamber and has a largely watertight seal against the brewing chamber. After a predetermined dwell time, the obtained tea extract is displaced from the brewing chamber by an upward movement of the plunger and, if applicable, discharged through a filter arranged in the head region of the brewing chamber. The extracted tea leaves with residual moisture remaining in the brewing chamber can be compressed by further upward movement of the plunger, and the thereby obtained extract can be supplied to the already discharged extract. By opening the brewing chamber and moving the plunger further upward, the compressed tea leaves can be pushed out of the brewing chamber.

The essential features for the industrial extraction of a tea solution as mentioned above are known from EP 2 837 290 A1. It is proposed therein that the tea raw materials are brought into contact for a predetermined dwell time in a standing liquid in a first method step, and with another flowing liquid in a second method step. According to an advantageous embodiment of the method, the tea solution is discharged after expiration of the dwell time and, while discharging the tea solution, a predetermined amount of a liquid is simultaneously added to the tea raw material in a flow. The above-described method is carried out in a vessel, wherein after draining the vessel, the liquid adhering to the remaining extracted tea raw material is dissolved by pressure surges of gas.

A method for extracting a consumable material consisting of a solid raw material, such as coffee or tea, is described in DE 699 29 220 T2 or PCT/US99/23178. The solid raw material is formed in an enclosed volume of a container, for example in the form of a bed. A volume of aqueous solvent is fed to the enclosed volume and the quantity of solid raw material. The extraction occurs under the exertion of pressure, wherein the solvent is water at a temperature that exceeds room temperature and is preferably between approximately 88 and approximately 100° C. The water flows through the solid raw material, and the aqueous extract generated thereby is discharged from the container.

BRIEF SUMMARY

An object of the present invention is to create a method for producing an extract by means of solid-liquid extraction, in particular solid-liquid hot extraction, and a device for performing the method, preferably for large industrial applications that, on the one hand, improve the exchange of substances during the extraction in comparison to prior art solutions and that, on the other hand, enable a further improved dehumidification of a raffinate with residual moisture to obtain a particularly valuable extract.

In general, and using an extraction container, a secondary solvent in the extraction container and a primary mixture consisting of a solid, primary solvent and a transition component are brought into contact with each other for a predetermined dwell time to obtain the extract. In so doing, the primary mixture is enclosed in at least one liquid-permeable vessel within the extraction container. The primary mixture is introduced with a predetermined second mass into the vessel located in the extraction container, the extraction container is filled with a predetermined first mass of the secondary solvent, and, after the dwell time, the obtained extract and a complementary portion of raffinate are separated from each other. An extract freed from raffinate with residual moisture is discharged from the extraction container. The residual moisture consisting of extract is at least partially removed from the raffinate with residual moisture through dehumidification by mechanical pressing in the vessel and supplied to the extract. By means of the proposed invention, in particular the large-scale industrial production of a tea concentrate is enabled that is procedurally and technologically based on the aforementioned solid-liquid hot extraction, and in which the tea raw material such as tea leaves, flowers, stalks, grains, seeds, roots, or other plant components, and hot water or boiling water are brought into contact with each other.

In the following, in addition to the terms for the general use of the method according to the invention, reference will be made to the special production of a tea concentrate by means of the method according to the invention, wherein the appropriate terms for special production will be in square brackets and italicized.

The invention is procedurally based on a method for producing an extract [tea concentrate] by means of solid-liquid extraction using an extraction container. In so doing, a secondary solvent [hot water or boiling water; hereinafter hot water always stands for boiling water] and a primary mixture [tea leaves or tea raw material; hereinafter, tea leaves always stand for tea raw material] consisting of a solid, primary solvent [carrier material] and a transition component [theine and other desirable and undesirable accompanying substances] are brought into contact with each other for a predetermined dwell time [brewing time]. In so doing, the primary mixture is enclosed in at least one liquid-permeable vessel within the extraction container, wherein the vessel in the most general case forms any desired shaped space, preferably cylindrical or prismatic, whose main axis is preferably oriented in the direction of the vertical main axis of the extraction container.

The primary mixture is introduced with a predetermined second mass into the vessel located in the extraction container, the extraction container is filled with a predetermined first mass of the secondary solvent, preferably at the brewing temperature or somewhat higher, and after the dwell time, the obtained extract and a complementary portion of raffinate (=primary solvent after extraction) [extracted tea leaves] are separated from each other. An extract freed from raffinate with residual moisture is discharged from the extraction container. The residual moisture consisting of extract is at least partially removed from the raffinate with residual moisture through dehumidification by mechanical pressing carried out in the vessel, and supplied to the extract.

The underlying object of the invention is achieved by process engineering when the following method steps (i) to (v) are provided in the method of the generic type.

In the method, the inventive first basic concept is, on the one hand, substantially that, to achieve the proposed object with regard to improving the exchange of substances during extraction, the primary mixture [tea leaves] enclosed in the vessel is flooded in the form of at least one flow released in a planned manner, at least at sections of the vessel that are accessible to the flow of secondary solvent [hot water] and, over the course of extraction, is flooded with the obtained, existing extract [tea concentrate]. The exchange of substances is significantly improved if, alternatively or additionally, the primary mixture is swirled and kept in suspension within the vessel by supplying the secondary solvent or the respective obtained extract via a foot area of the vessel through an upwardly directed fourth flow. By means of this measure, the primary mixture can swell unhindered and thereby enlarge its surface that limits the exchange of substances.

On the other hand, the above measures are carried out alternatively or overlapping each other with the same goal by moving the vessel relative to the extraction container within the secondary solvent and, over the course of extraction, are substituted or also accompanied within the obtained available extract, i.e., flooding, swirling, and keeping in suspension as well as moving.

To further improve the exchange of substances, another inventive basic concept is to circulate the secondary solvent or the extract in the extraction container from the top to the bottom, relative to the extraction container, by means of a circulation guide incorporating the extraction container. Circulating, flooding and swirling and keeping in suspension can be combined with each other as desired.

An inventive concept known per se for achieving the proposed object with the aim of further improving dehumidification of a raffinate with residual moisture [extracted tea leaves with residual moisture] to obtain more highly valuable extract [tea concentrate], is to treat the raffinate with residual moisture by mechanical pressure in the vessel. This pressure is preferably applied within the extraction container. It can also be performed outside of same, wherein the highly valuable extract thereby obtained is also supplied to the already separated extract.

Method

Step (i): Introduce the primary mixture [tea leaves] having a predetermined second mass into the vessel located in the extraction container, or placing the vessel filled with the primary mixture having a predetermined second mass into the extraction container.

The at least one vessel is preferably filled inside or also outside of the extraction container with the predetermined second mass according to a predetermined first concentration. The second mass is smoothly and gently supplied by expediently adding a suitable amount of water to the second mass to more or less prepare a sludge that permits easy and gentle conveyance, preferably by means of a product-friendly, rotating displacement pump.

Step (ii): Enhance solid-liquid extraction during a first dwell time by: at least partially flooding the vessel in the form of at least one flow discharged in a planned and targeted manner with the secondary solvent [hot water] or the obtained extract [tea concentrate], and/or swirling and keeping in suspension the primary mixture within the vessel by supplying the secondary solvent or the obtained extract via a foot area of the vessel through an upwardly directed fourth flow, and/or moving the vessel relative to the extraction container within the obtained extract or the secondary solvent.

Flooding with the obtained extract or with the initially available secondary solvent can be carried out on all surface areas of the vessel accessible from the interior of the extraction container, or also only at sections in the form of at least one flow discharged in a planned and targeted manner. A forced flow can be achieved by a rimmed flow guide, and a free flow can be achieved by, for example, means generating circulating movements. The target direction can for example be influenced by nozzles together with the rim of the flow guide, or by flow-directing means together with the circulating movements. Swirling and preferably evenly keeping the primary mixture in suspension create swelling opportunities that promote the exchange of substances for the primary mixture [tea leaves], and ensure the maintenance of a sufficient concentration gradient driving the exchange of substances.

The movement can be carried out in preferably salient directions of the vessel, in particular in the direction of the vertical axis of symmetry of the vessel, wherein a back-and-forth first translatory movement, or alternatively a first rotary movement, or an overlap of both degrees of freedom of movement is provided.

Step (iii): Circulate the secondary solvent or the extract in the extraction container by a circulation guide incorporating the extraction container from top to bottom relative to the extraction container.

A further enhancement of the exchange of substances results when the secondary solvent or the extract in the extraction container is circulated from top to bottom relative to the extraction container by a circulation guide incorporating the extraction container. This circulation guide can be advantageously carried out in any phase of the first and a second dwell time.

Step (iv): Supply the extract obtained by dehumidification and freed from raffinate with residual moisture to the extract freed from raffinate with residual moisture that is already separated or to be separated.

If the vessel remains in the extraction container after extraction, then the extract obtained by pressing the extracted raffinate, for the purpose of dehumidifying the extracted raffinate, can be supplied to the extract that is already separated or is to be separated. The same procedure can be used if the vessel is removed from the extraction container for the purpose of pressing the extracted raffinate.

Step (v): Fill the extraction container with a predetermined additional first mass of the secondary solvent, after the first dwell time according to step (ii) wherein the solid-liquid extraction is continued with a second dwell time.

Step (v) of the method improves the intensity of the exchange of substances in extraction according to the invention in that, after the first dwell time [first brewing time] according to step (ii), a filling of the extraction container with a predetermined additional first mass of the secondary solvent is provided. According to this measure, "replenishing with secondary solvent", the concentration gradient that significantly influences the exchange of substances between the substance-exchanging components is increased. After this measure, it is furthermore provided that the solid-liquid extraction is continued by a second dwell time [second brewing time].

Discharging the extract from the extraction container by draining, perhaps supported by a conveying apparatus and/or a gaseous propellant, very easily enables the extract to be separated from the raffinate with residual moisture.

Mechanically pressing the extracted raffinate is carried out using a liquid-permeable vessel that for example is either elastically deformable overall, or in which a partial surface is designed to be movable, for example in the form of a plunger.

To ensure effective dehumidification by pressing the raffinate with residual moisture, it is provided that the dehumidification starts at the earliest upon the commencement of drying out a first part of the raffinate with residual moisture in the vessel remaining in the extraction container. If dehumidification is carried out in the vessel removed from the extraction container, the aforementioned effective dehumidification is ensured from the start.

According to an additional proposal, all the extract that is obtained and freed from raffinate with residual moisture [tea concentrate] is then subjected to filtering to separate undesirable particles that pass through the first outlets in the liquid-permeable vessel. The first outlets are preferably formed by a wall of the vessel that consists of three layers of a particular sieve. The two outer sieves preferably have a pore size of 1 mm, and the middle sieve preferably has a pore size of 0.25 mm. The undesirable particles that accordingly pass through the first outlets and are subjected to said filtering, have a particle size less than 0.25 mm in the exemplary embodiment. They are subject in the context of end filtration in the form of microfiltration that preferably has a pore diameter of 200 nm to 400 nm and thereby removes larger trub constituents, whereby valuable contents are retained to an acceptable extent.

It has proven to be useful when a preliminary clarification by separation in a centrifugal field is upstream of the filtering, which significantly increases the service life of a filter apparatus for performing the filtering.

To accelerate the draining process while simultaneously treating the extract in a product-friendly manner, it is moreover provided that discharging the extract freed from raffinate with residual moisture that in principle is automatic or also by force, is additionally supported by gas pressure from a gaseous propellant that is applied to a free surface of the extract. The gaseous propellant can for example be sterile air or nitrogen.

The method with regards to the mode of operation of the extraction container provides that the method is performed in an extraction container that is designed as a discontinuously working homogeneous reaction container.

To increase the production output, more than one extraction container is operated in parallel and simultaneously, or in parallel and delayed. The obtained extract is then treated further until final filtration at the same time or at a delay in the above-described processing line.

A device according to the invention for producing an extract by solid-liquid extraction, preferably by solid-liquid hot extraction, using an extraction container is configured in a known manner such that the extraction container accommodates in itself at least one liquid-permeable vessel for receiving a primary mixture [tea leaves] consisting of a solid primary solvent [carrier substances] and a transition component [theine and other desirable and undesirable accompanying materials]. Moreover, the extraction container is configured to bring a secondary solvent [hot water] into contact with the primary mixture, and separate the generated results of extraction into a raffinate with residual moisture [extracted tea leaves with residual moisture], and into an extract freed from raffinate with residual moisture [tea concentrate freed from extracted tea leaves with residual moisture]. With respect to its first outlets, for example sieve openings, the liquid-permeable vessel is dimensioned such that, as described above, the raffinate with residual moisture is separated to a sufficient extent from the extract freed from the raffinate with residual moisture.

The extraction container possesses at least one first supply connection for supplying the secondary solvent that preferably discharges into the top region of the extraction container, if necessary a second supply connection for the supply of the primary mixture, and a connection for discharging the extract.

The first supply connection in the top region of the extraction container allows the secondary solvent to be supplied from above, i.e., secondary solvent flows through, or respectively penetrates the primary mixture [tea leaves] in the vessel from top to bottom during the relevant filling of the extraction container with secondary solvent.

The connection discharges with a drain line. From the drain line, a circulating line branches off at a first branching point that, viewed in the direction of flow, branches after a conveying apparatus into at least one additional supply connection leading to an interior of the extraction container.

The additional supply connection continues in a top pipe that discharges above of the vessel. The top pipe is alternatively or additionally fluidically connected to a flexible pipe, and the flexible pipe runs fluidically to a second ring line that is arranged in the foot area of the vessel and extends radially on the inside of the foot area and over its entire circumference and, at its top side facing the interior of the vessel, has a plurality of exit openings arranged distributed over the circumference of the second ring line.

The extraction container has a moving apparatus that is configured to set the vessel within the extraction container into a back-and-forth first translatory movement, and/or into a first rotary movement relative to the extraction container. The device possesses a pressing apparatus that is configured to press a content of the vessel. Moreover, a control apparatus is provided that is connected in terms of signaling to at least the moving apparatus and the pressing apparatus.

One embodiment furthermore provides that the connection is used as needed for supplying the secondary solvent. The alternative supply of the secondary solvent via the connection preferably arranged at the bottom end of the extraction container more or less realizes, or respectively simulates an immersion of the primary mixture [tea leaves] like traditional domestic preparation of a tea beverage. If the liquid-permeable vessel is filled with primary mixture outside of the extraction container, the second supply connection can be omitted.

One advantageous embodiment provides that three additional supply connections are continued in associated piping, of which one bottom pipe discharges below, the top pipe discharges above, and one middle pipe discharges in the region of the circumference of the vessel. As needed, this allows a particularly effective flooding of the vessel from all sides with secondary solvent or extract, which is all the more effective if the vessel moves in a translatory and/or rotary manner at the same time.

Because the aforementioned first outlets of the liquid-permeable vessel have a separation limit with respect to the particles to be separated, these particles, that pass through the first outlets quantified above as an example and are generally undesirable, burden the extract and must be separated in another treatment step. For this purpose, viewed in the direction of flow, a filter apparatus is arranged after the first branching point in the drain line, wherein this filter apparatus is preferably designed as a microfilter.

Because the filter apparatus is to preferably perform a final clarification of the extract, i.e., separation of fine and very fine particles that were quantified above with respect to their particle size, larger particles that pass through the first outlets of the vessel impair the service life of the filter apparatus. To avoid this, an advantageous embodiment of the device provides that, viewed in the direction of flow, a centrifugal separator is upstream from the filter apparatus that provides preliminary clarification of the extract.

The extraction container is preferably designed as a discontinuously working homogeneous reaction container in the nomenclature of processing engineering or chemical technology.

To accelerate the automatic or forcible discharge of the extract freed from raffinate with residual moisture [tea concentrate freed from extracted tea leaves with residual moisture] in a product-friendly manner, the extraction container has a third supply connection for the supply of a compressed gas in the region of its top end.

To increase production output, it is moreover provided that the extraction container accommodates in itself more than one vessel inside such that the vessels are grouped therein in a single-axis or multi-axis rowed arrangement. The moving apparatus is configured to supply the more than one vessel with first or secondary mechanical energy. It is moreover proposed to group the vessels in a single circular, or concentric multi-circular arrangement in each case with or without occupying the center in the extraction container.

In the rowed arrangement of the vessels, it is provided that the first translatory movement of the individual vessel overlaps a second back-and-fourth translatory movement whose direction is preferably determined by the direction of the particular axis that is formed by the preferably vertical axes of symmetry of the single-axis or multi-axis rowed arrangement of the vessels.

The penetration of the primary mixture located within the liquid-permeable vessel with secondary solvent or already generated extract is facilitated and accelerated when a liquid-permeable modified vessel forms an enclosed chamber for storing the primary mixture through which an inner passage extends completely from one to the other face of the liquid-permeable modified vessel. Preferably, this chamber has a ring-cylindrical shape, and its inner passage extends from one to the other face of the chamber. The inner passage allows improved removal of the extract from the particular core region of the bulk of the primary mixture within the modified vessel because the necessary penetration depth is decreased, and when the modified vessel is flooded from the outside, the extract can be removed through the inner passage.

The proposed method according to the invention, the proposed device according to the invention, and the vessel are particularly suitable to be used for producing a tea concentrate.

BRIEF DESCRIPTION OF THE DRAWINGS

The invention is represented in more detail by the following description and the appended figures of the drawing and the claims. The invention can be realized in a wide range of embodiments of a method for producing an extract by means of solid-liquid extraction of the generic type. Moreover, the invention is realized in a wide variety of embodiments of a device for producing an extract by solid-liquid extraction and a vessel for this device. In the following, the method, the device and the vessel will be described in a preferred use case for producing a tea extract with reference to the drawing.

DETAILED DESCRIPTION

General

Figure 1:
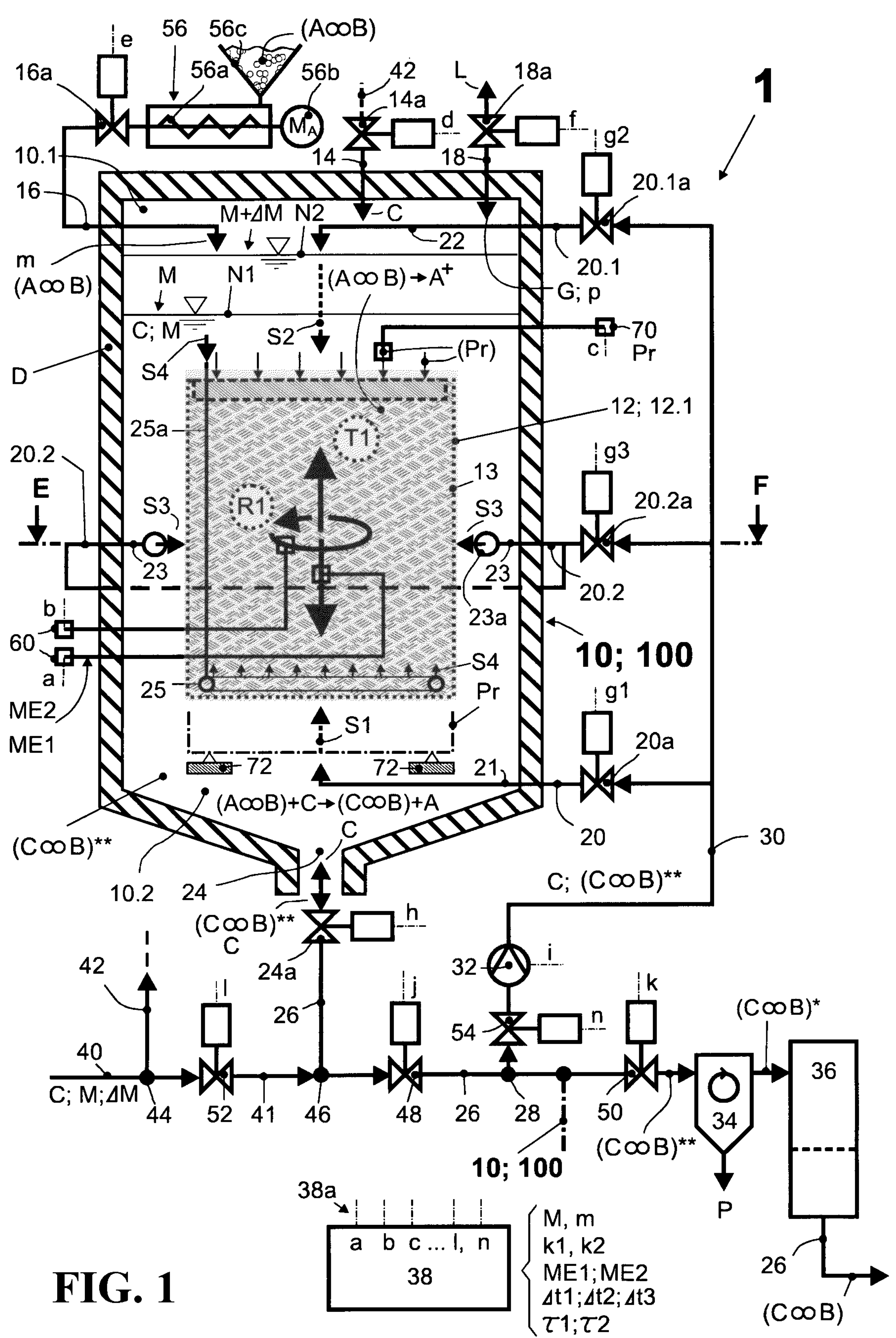
FIG. 1 shows a schematic representation of a device according to the invention with an extraction container according to the invention and a liquid-permeable vessel according to the invention.

Initially a few basic notes are offered in advance to help understand the following symbols for illustrating solid-liquid extraction, or respectively solid-liquid hot extraction (with regard to the following and also preceding notation: 1. terms for the generic case come first; 2. [production of tea concentrate] comes second).

A solid-liquid extraction exists for example when tea concentrate is extracted from tea leaves with the assistance of water. Extraction is therefore not complete decomposition, because only one of the components to be separated is in an approximately pure state; the others are only relocated and are present in a mixture after the extraction.

A feed mixture (A∞B) is termed "primary mixture" [tea leaves], and a solution generated by extraction is termed "secondary mixture" or extract (C∞B) [tea concentrate], wherein the notation (A∞B), or respectively (C∞B) designates the phase "mixture", or respectively "solution". A substance transitioning from one phase to the other is termed a "transition component" [theine and other desirable or undesirable accompanying substances] that in the following will be identified as B. A non-transitioning component of the primary mixture is a "primary solvent" or a carrier material A [carrier material before extraction]. After extraction, it occurs in a nearly pure state as a "raffinate" A (primary solvent after extraction) [extracted tea leaves], whereas the extract (C∞B) [tea concentrate] is composed of a secondary solvent C [water; hot extraction: hot water or boiling water→reduced hereinafter to hot water] and the transition component B [theine and other desirable or undesirable accompanying substances] (filter the extract to remove undesirable particles). The above solid-liquid extraction or solid-liquid hot extraction can be depicted as follows using the above symbols by the following formula (1) (see also FIGS. 1 and 5):

$$(A\infty B)+C\rightarrow(C\infty B)+A, \quad (1)$$

wherein the term (A∞B)+C will hereinafter be termed a mixture (of the primary mixture and secondary solvent) [mixture (of tea leaves and hot water)], and the term (C∞B)+A will hereinafter be termed a mixture (of extract+raffinate after extraction) [tea concentrate+extracted tea leaves].

In general, and using an extraction container, a secondary solvent in the extraction container and a primary mixture consisting of a solid, primary solvent and a transition component are brought into contact with each other for a predetermined dwell time to obtain the extract. In so doing, the primary mixture is enclosed in at least one liquid-permeable vessel within the extraction container. The primary mixture is introduced with a predetermined second mass into the vessel located in the extraction container, the extraction container is filled with a predetermined first mass of the secondary solvent, and, after the dwell time, the obtained extract and a complementary portion of raffinate are separated from each other. An extract freed from raffinate with residual moisture is discharged from the extraction container. The residual moisture consisting of extract is at least partially removed from the raffinate with residual moisture through dehumidification by mechanical pressing in the vessel and supplied to the extract. By means of the proposed invention, in particular the large-scale industrial production of a tea concentrate is enabled that is procedurally and technologically based on the aforementioned solid-liquid hot extraction, and in which the tea raw material such as tea leaves, flowers, stalks, grains, seeds, roots, or other plant components, and hot water or boiling water are brought into contact with each other.

Device (FIGS. 1 to 4)

A device 1 according to the invention for the industrial production of the extract (C∞B) by means of solid-liquid extraction, in particular solid-liquid hot extraction, by means of an extraction container 10, 100 according to the invention is shown in FIG. 1.

The extraction container 10, 100 incorporates at least one liquid-permeable vessel 12, 12.1 provided with first outlets 13 for receiving the primary mixture (A∞B), consisting of the solid primary solvent A and the transition component B. The vessel 12, 12.1 can form any desired volume; preferably, a cylindrical or prismatic shape whose longitudinal axis is preferably oriented in the direction of the longitudinal axis of the extraction container 10, 100. The extraction container 10, 100 is configured to bring the secondary solvent C into contact with the primary mixture (A∞B), and to separate the generated results of extraction, the extract (C∞B), into a raffinate with residual moisture $A^+$ and into an extract (C∞B)** freed from raffinate with residual moisture $A^+$.

In a top region, a headspace 10.1, the extraction container 10, 100 possesses a first supply connection 14 with a first supply valve 14*a* for supplying the secondary solvent C that is added with a predetermined first mass M, and where it forms a first free surface N1, a first liquid level. If necessary, a second supply connection 16 is provided in the first headspace 10.1 with a second supply valve 16*a* through which the vessel 12, 12.1 located in the extraction container 10, 100 is filled with a primary mixture (A∞B) [tea leaves] having a predetermined second mass m. The first mass M and the second mass m together yield a corresponding mixture (A∞B)+C [mixture of tea leaves and hot water]. A foot area 10.2 of the extraction container 10, 100 has a connection 24 with a connection valve 24*a* for draining the extract (C∞B) freed from raffinate with residual moisture $A^+$, and if needed for supplying the secondary solvent C. Moreover, at the top end of the headspace 10.1, a third supply connection 18 with a third supply valve 18***a* is provided for supplying a gaseous propellant, a compressed gas G, with a gas pressure p. While filling the extraction container 10, 100, a pressure equilibrium is usefully established by draining displaced air L via the third supply connection 18 and the associated third supply valve 18*a*. The extraction container 10, 100 possesses insulation D for thermal insulation against its environment.

The connection 24 discharges into a drain line 26 that, viewed in the direction of flow and preferably vertically spaced from the connection 24 by a sufficient supply height in the direction of gravity, has a first shutoff valve 48 after a joining point 46 into which a first supply line section 41 discharges. The drain line 26 furthermore accommodates a second shutoff valve 50, also viewed in the direction of flow, after a first branching point 28. Following the second shutoff valve 50, viewed in the direction of flow, a filter apparatus 36 is arranged in the drain line 26 for separating fine and very fine particles from the extract, wherein by means of the filter apparatus 36, the extract becomes filtered extract (C∞B) from extract (C∞B) freed from raffinate with residual moisture $A^+$. The first supply line section 41 can be shut off by a third shutoff valve 52. A supply line 40, through which the secondary solvent C with the first mass M and an additional first mass ΔM is provided, branches at a second branching point 44 into the first supply line section 41 and into a second supply line section 42, wherein the latter is connected via the first supply valve 14***a* to the first supply connection 14.

For preliminary clarification of the extract (C∞B) freed from raffinate with residual moisture, a centrifugal separator 34 for separating coarser particles P that have passed out of the extraction container 10, 100 through the first outlets 13 of the vessel 12, 12.1 while discharging the extract (C∞B) freed from raffinate with residual moisture, is optionally upstream from the filter apparatus 36, also viewed in the direction of flow. As a result, the extract (C∞B)** freed from raffinate with residual moisture discharged at this point becomes a pre-clarified extract (C∞B)*, which has the effect of extending the service life of filter device 36.

A circulating line 30 branches from the drain line 26 at the first branching point 28 and, viewed in the direction of flow, branches into at least one additional supply connection 20 along the way through a fourth shutoff valve 54 and a downstream delivery apparatus 32, wherein three additional supply connections 20, 20.1, 20.2 are provided in the exemplary embodiment that each lead to the interior of the extraction container 10, 100. The additional supply connections 20, 20.1, 20.2 can each be shut off with an associated additional shutoff valve 20*a*, 20.1*a*, 20.2*a*.

In one proposed embodiment, the three additional supply connections 20, 20.1, 20.2 continue in associated piping 21, 22, 23, of which one bottom pipe 21 discharges below, one top pipe 22 discharges above, and one middle pipe 23 discharges in the region of the circumference of the vessel 12, 12.1. The middle pipe 23 leads into a first ring line 23*a* enclosing the vessel 12, 12.1 (FIGS. 2 and 1), wherein preferably at least two connections are provided that are arranged diametrically opposite to each other, or respectively preferably evenly distributed over the circumference of the first ring line 23*a*. The first ring line 23*a* is preferably provided, in the region of its circumferential region facing the vessel 12, 12.1, with a plurality of second outlets 23*b* preferably distributed evenly over the circumference that enable the vessel 12, 12.1 filled with primary mixture (A∞B) to be flooded with secondary solvent C, or with the generated extract (C∞B) freed from raffinate with residual moisture in the form of a third flow S3. A planned and targeted first flow S1 is discharged through the bottom pipe 21, and such a second flow S2 is discharged through the top pipe 22 in the form of an above-described flooding of the particular face of the vessel 12, 12.1**.

The top pipe 22 is optionally or also fluidically connected to a pipe 25*a* that is flexible at least in its connecting region. It either fluidically leads from the outside or inside of the vessel 12, 12.1 to a second ring line 25 arranged in a foot area of the vessel 12; 12.1 that extends radially there on the inside and over its entire circumference. On its top side facing the interior of the vessel 12; 12.1, the second ring line 25 has a plurality of exit openings arranged distributed over its circumference through which a fourth flow S4, which can correspond to the second flow S2 or a part thereof, is discharged into the interior of the vessel 12, 12.1.

The extraction container 10, 100 has a moving apparatus 60 that is configured to set the vessel 12, 12.1 within the extraction container 10, 100 into a back-and-forth first translatory movement T1 (in a reciprocating first translational movement relative to the extraction container to enhance solid-liquid extraction (e.g., or enhancing the solid-liquid extraction)), and/or into a first rotary movement R1 by supplying first and second mechanical energy ME1, ME2. The first mechanical energy ME1 is associated with the filling level of the extraction container 12, 12.1 with the first mass M (first free surface N1), and the second mechanical energy ME2 is associated with that of the first mass M and the additional first mass ΔM (a second free surface N2).

The device 1 possesses a pressing apparatus 70 that, in the exemplary embodiment, is arranged and configured in the extraction container 10, 100 to press a content of the vessel 12, 12.1 therein. A pressure Pr acts for example on a movably designed partial surface of the vessel 12, 12.1, for example in the form of a liquid-permeable plunger, wherein a reaction force to the pressure Pr is generated by supports 72 for the pressing apparatus as shown in FIG. 1.

If the device 1 is configured to fill the vessel 12, 12.1 outside of the extraction container 10, 100 with primary mixture (A∞B) (a second mode of operation), the pressing apparatus 70 and the associated supports 72 can also be usefully arranged outside of the extraction container 10, 100. In this case, the dehumidification according to the invention of the raffinate with residual moisture $A^+$ can also usefully be carried out by mechanically pressing same outside of the extraction container 10, 100. Moreover, in the last-mentioned second mode of operation, after placing the vessel 12, 12.1 filled with primary mixture (A∞B), the extraction container 10, 100 is either filled with secondary solvent C as described above, or the related vessel 12, 12.1 is lowered into the secondary solvent C added to the extraction container 10, 100 with the first mass M (adding additional first mass of the secondary solvent without removing any extract from the extraction container).

If, in a first mode of operation, the vessel 12, 12.1 in the extraction container 10, 100 is filled with the primary mixture (A∞B) [tea leaves], the second supply connection 16 is usefully connected to a product-friendly, preferably rotating delivery apparatus 56 that preferably has a screw conveyor 56*a* that is driven by a drive 56*b*, preferably by a controllable drive motor MA. The primary mixture (A∞B) is kept in a storage tank 56*c* from which it runs to the screw conveyor 56*a*, preferably prepared with water into a sludge. In both modes of operation, the extract (C∞B) freed from raffinate with residual moisture (at least partially removing the residual moisture) through dehumidification by means of pressing can be supplied to the extract (C∞B) freed from raffinate with residual moisture that is already separated or to be separated.

A control apparatus 38 is provided that is connected in terms of signaling by signal transmission lines 38*a* to at least the moving apparatus 60 and the pressing apparatus 70 (signal connections a, b, c). The supply valves 14*a*, 16*a*, 18*a* and 20*a* to 20.2*a*, the connection valve 24*a*, the delivery apparatus 32 and the shutoff valves 48, 50, 52 and 54 are controlled in automatic mode by the control apparatus 38 via the signal connections d, e, f, and g1 to g3, h, i, and j, k, l, and n.

Additional extraction containers 10, 100 of the above-described type can be connected to the drain line 26 between the first branching point 28 and the second shutoff valve 50 to increase the production output of the device 1.

Figures 2, 3A, 3B, 4:
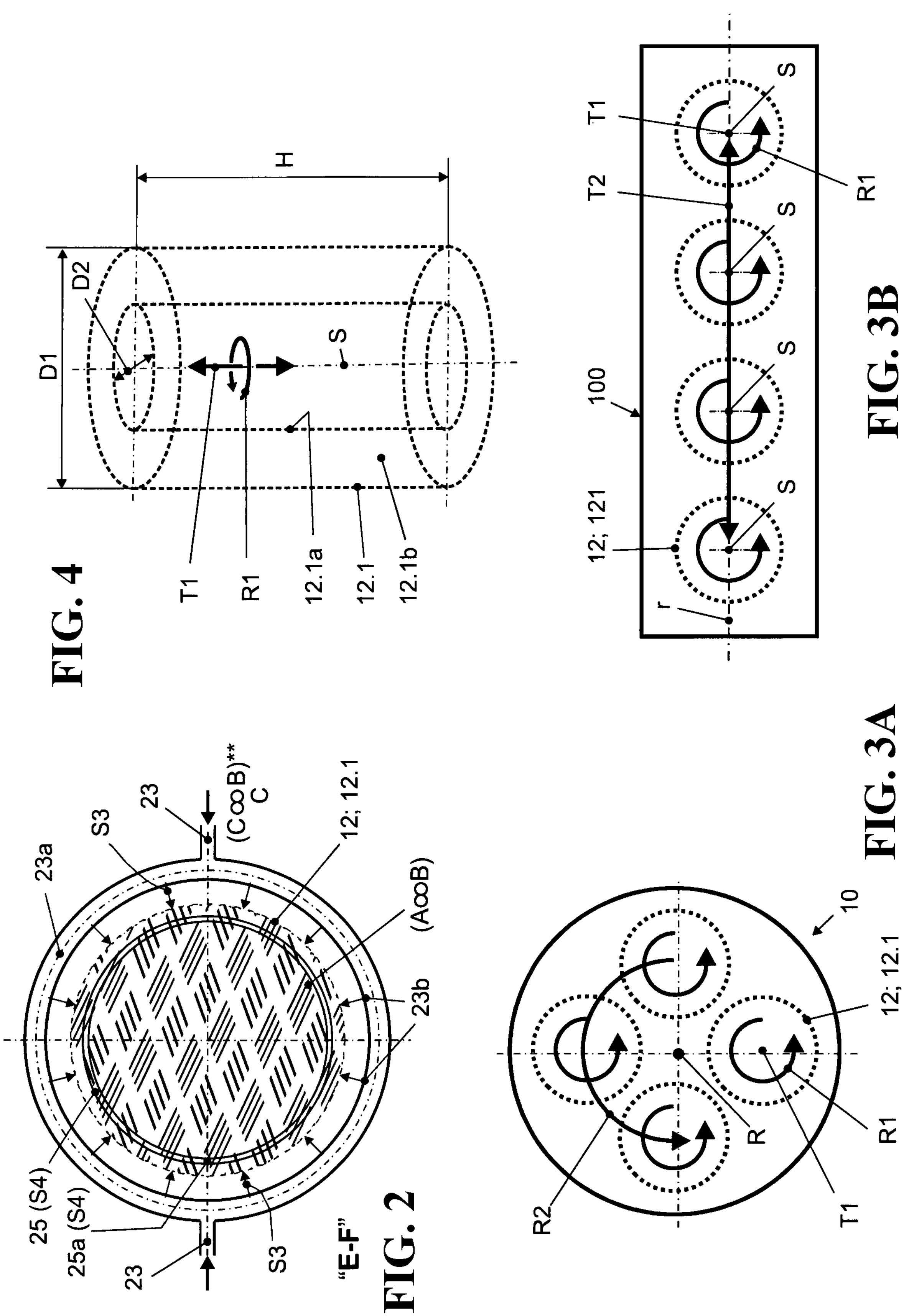
FIG. 2 shows a schematic representation of a cross-section of the extraction container corresponding to a sectional identified in FIG. 1 with line "E-F", wherein only the cutaway inner region of the extraction container is depicted.
FIG. 3A shows a schematic diagram of a cross-section of a substantially cylindrical extraction container within a device according to FIG. 1 with four liquid-permeable vessels in a single circular arrangement.
FIG. 3B shows a schematic diagram of a cross-section of a substantially cuboid extraction container within a device according to FIG. 1 with four liquid-permeable vessels in a single-axis rowed arrangement.
FIG. 4 shows a schematic representation of a perspective of a liquid-permeable modified vessel in a ring-cylindrical shape with an inner passage.

The extraction container 10 in a substantially cylindrical shape is configured to accommodate inside itself more than one vessel 12, 12.1 in a single circular FIG. 3A or concentric multi-circular arrangement (not shown) in each case with or without occupying the center. The rotary movement R1 can be overlapped in each case by the first translatory movement T1.

A modified extraction container 100 in a substantially cuboid embodiment FIG. 3B is configured to accommodate in itself more than one vessel 12, 12.1 in a single axis or multi-axis rowed arrangement. In this arrangement of the vessels 12, 12.1, the first translatory movement T1 of the individual vessel 12, 12.1 overlaps a second back-and-forth translatory movement T2 whose direction r is determined by the direction of the particular axis that is formed by the axes of symmetry S of the single-axis or multi-axis rowed arrangement. The translatory movements T1, T2 can be overlapped in each case by the first rotary movement R1.

FIG. 4 shows a liquid-permeable, modified vessel 12.1 that forms an enclosed chamber 12.1*b* for storing the primary mixture (A∞B) through which an inner passage 12.1*a* runs completely from one to the other face of the modified vessel 12.1. The chamber 12.1*b* preferably has a ring-cylindrical shape with a preferably cylindrically designed inner passage 12.1*a* that extends completely from one to the other face of the chamber 12.1*a*. An outer diameter of the modified vessel 12.1 is identified with D1, its inner diameter (inner passage 12.1*a*) is identified with inner diameter D2, and its height is identified with H. For the predetermined second mass m of primary mixture (A∞B) in the modified vessel 12.1, the required penetration depth to be overcome by the secondary solvent C or the existing extract to the core of the particular bulk becomes all the more smaller the smaller the difference in diameter D1-D2, and therefore the greater the height H (slim ring cylinder). The first translatory movement T1 and the first rotary movement R1 are usefully oriented along the preferably vertically aligned axis of symmetry S of the ring-cylindrical, modified vessel 12.1.

Figure 5:
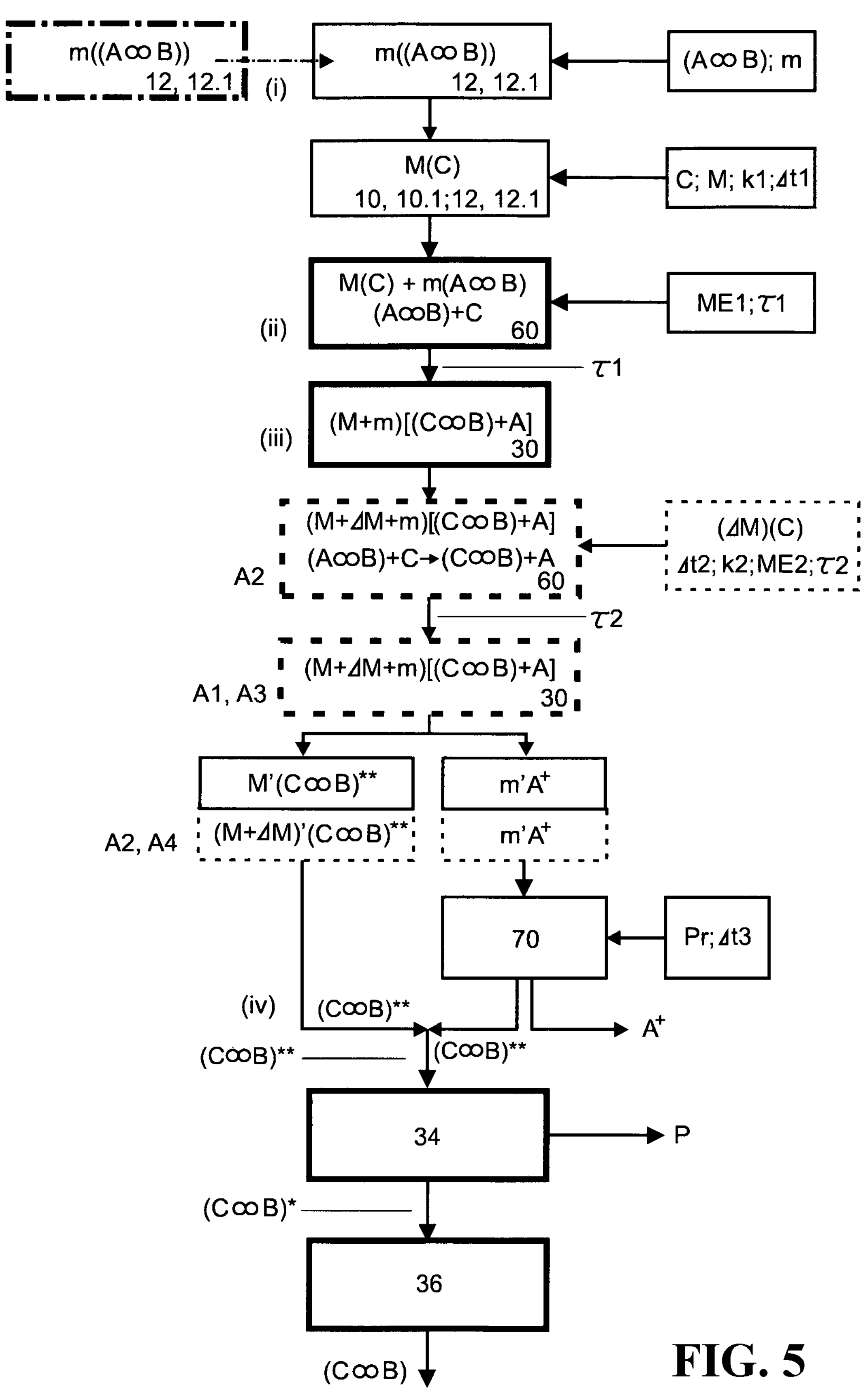
FIG. 5 shows a flow chart of the method according to the invention.

Method (FIGS. 1 and 5)

A method according to the invention is characterized by the method steps (i) to (v) described above, whose interrelationship and meaning are graphically illustrated in a flow-chart in FIG. 5. The steps (i) to (v) may be sub-steps. The following description of the method offers the terminology for production of tea concentrate as indicated in the list of reference numerals for the employed abbreviations in the concordance of superordinate terms, in addition to the superordinate terms. The new method steps, or respectively treatment features in comparison to the prior art, are highlighted in FIG. 5 by a thicker line.

According to step (i), a primary mixture (A∞B) [tea leaves] with the predetermined second mass m is introduced into the vessel 12, 12.1 located in the extraction container 10, 100 via the second supply connection 16, or the vessel 12, 12.1 filled with primary mixture (A∞B) with a predetermined second mass is placed to the extraction container 10, 100 (arrow at (i))-(FIG. 5: Specification of (A∞B) and m, →m ((A∞B)); FIG. 1).

In a manner known per se, the extraction container 10, 100 is filled with a predetermined first mass M of the secondary solvent C [hot water] corresponding to a predetermined first concentration k1=m/M via the first supply connection 14, or alternatively via the connection 24 up to the first free surface N1 (first liquid level) over a first filling time Δt1 (FIG. 5: Specification of C, M, k1 and Δt1→M (C); FIG. 1).

The first concentration k1 is defined by equation (1):

$$k1 = \frac{m}{M} = \frac{m(A\infty B)}{M(C)} \tag{1}$$

The subsequent extraction over the first dwell time t1 [brewing time] can be represented by the following formula (2):

$$(A\infty B) + C \rightarrow (C\infty B) + A \tag{2}$$

The first mass M of secondary solvent C [hot water] and the second mass m of primary mixture (A∞B) [tea leaves] form, at the beginning of the first dwell time 11, the mixture (A∞B)+C.

According to step (ii), solid-liquid extraction intensifies during the first dwell time t1 through at least one of: at least partially flooding the vessel 12, 12.1 in the form of at least one flow discharged in a planned and targeted manner with the secondary solvent C or the obtained extract (C∞B); swirling and keeping in suspension the primary mixture (A∞B) within the vessel 12, 12.1 (by stirring up the primary mixture and keeping afloat the primary mixture) by supplying the secondary solvent C or the obtained extract (C∞B) via a foot area of the vessel 12, 12.1 through an upwardly directed fourth flow S4; or moving the vessel 12, 12.1 relative to the extraction container 10, 100 within the obtained extract (C∞B) by supplying first mechanical energy ME1 via the moving apparatus 60. Step (ii) may include a substep (ii) that also includes moving the vessel in a first rotational movement.

According to step (iii), further intensification of the exchange of substances occurs by circulating the secondary solvent C [hot water] or the extract (C∞B) in the extraction container 10, 100 from top to bottom relative to the extraction container 10, 100 by a circulation guide 30 incorporating the extraction container 10, 100.

After the first dwell time t1, the mixture (C∞B)+A [tea concentrate+extracted tea leaves] with the overall mass M+m exists, consisting of the extract (C∞B) [tea concentrate] and the raffinate A [tea leaves] (FIG. 5: Specification of ME1 and τ1→(M+m) [(C∞B)+A]; FIG. 1).

According to step (iv), the extract (C∞B)** freed from raffinate with residual moisture through dehumidification is supplied to the extract (C∞B) freed from raffinate with residual moisture that is already separated or to be separated.

According to step (v) of the method, the intensity of substance exchange in extraction according to the invention is further improved in that, after the first dwell time τ1 [first brewing time] according to steps (ii, iii), a filling of the extraction container 10, 100 with a predetermined additional first mass ΔM of the secondary solvent C [hot water] is provided.

The additional first mass ΔM is supplied, corresponding to a predetermined second concentration k2=m/(M+ΔM), via the first supply connection 14, or alternatively via the connection 24 up to the second free surface N2 (second liquid level) over a second filling time Δt2.

The second concentration k2 is defined by equation (3):

$$k2 = \frac{m}{M + \Delta M} = \frac{m(A\infty B)}{M(C) + \Delta M(C)} = \frac{m(A\infty B)}{(M + \Delta M)(C))} \tag{3}$$

By this measure, "replenishing with secondary solvent" C [hot water], the concentration gradient that significantly influences the exchange of substances between the substance-exchanging components is increased. According to this measure, it is furthermore provided that the solid-liquid extraction is continued by a second dwell time τ2 [second brewing time]. During the second dwell time τ2, solid-liquid extraction is intensified by at least partially flooding the vessel 12, 12.1 and/or by swirling and keeping in suspension the primary mixture (A∞B) within the vessel 12, 12.1 according to step (ii) with the obtained extract (C∞B), and/or by moving the vessel 12, 12.1 relative to the extraction container 10, 100 within the obtained extract (C∞B) according to step (ii) by supplying secondary mechanical energy ME2 via the moving apparatus 60 (FIG. 5: Specification of Δt, k2, ME2 and τ2→(M+ΔM+m)[(C∞B)+A]; FIG. 1).

The above-described circulation guide according to step (iii) can advantageously carried out in any phase of the first and second dwell time τ1, τ2.

In a manner known per se, an extract (C∞B) [tea concentrate freed from extracted tea leaves with residual moisture] freed from the raffinate with residual moisture is discharged from the extraction container 10, 100 via the connection 24 into the drain line 26**.

A first mass M' of extract (C∞B) [tea concentrate freed from extracted tea leaves with residual moisture] freed from raffinate with residual moisture, and a second mass m' of raffinate with residual moisture $A^+$ [extracted tea leaves with residual moisture] exist (FIGS. 5, 1**).

In a manner known per se, the raffinate with residual moisture $A^+$ [extracted tea leaves with residual moisture] is dehumidified by mechanically pressing the raffinate with residual moisture $A^+$ in the vessel 12, 12.1 by means of the pressing apparatus 70 by applying a pressure Pr over a pressing time Δt3. The extract (C∞B) freed from raffinate with residual moisture additionally obtained thereby is supplied to the already obtained extract (C∞B) freed from raffinate with residual moisture A+ (FIG. 5: Specification of Pr and Δt3; FIG. 1).

As proposed, dehumidification preferably starts at the earliest upon the commencement of drying out a first part of the raffinate with residual moisture $A^+$ in the vessel 12, 12.1 remaining in the extraction container 10, 100 (the extraction container is designed as a homogenous batch reactor).

The tea concentrate (C∞B) freed from extracted tea leaves with residual moisture $A^+$ is usefully pre-clarified in the centrifugal separator 34 by separating particles P (via a centrifugal field) below the separating limit of the first outlets 13 in the vessel 12, 12.1**, and then supplied as a pre-clarified tea concentrate (C∞B)* to the filter apparatus 36 that it then leaves as a filtered tea concentrate (C∞B) in order, for example, to be further treated to become a tea beverage.

The following is a list of reference numbers used in the drawings and this description, with reference to the figures in which they first appear.

| FIGS. 1 to 4 | |
|---|---|
| 1 | Device |
| 10 | Extraction container |
| 100 | Modified extraction container |
| 10.1 | Headspace |
| 10.2 | Foot area |
| 12 | Vessel (liquid-permeable) |
| 12.1 | Modified vessel |
| 12.1a | Inner passage |
| 12.1b | Chamber |
| 13 | First outlets |
| 14 | First supply connection |
| 14a | First supply valve |
| 16 | Second supply connection |
| 16a | Second supply valve |
| 18 | Third supply connection |
| 18a | Third supply valve |
| 20, 20.1, 20.2 | Additional supply connections |
| 20a, 20.1a, 20.2a | Additional supply valves |
| 21 | Bottom pipe |
| 22 | Top pipe |
| 23 | Middle pipe (first ring line) |
| 23a | First ring line |
| 23b | Second outlet |
| 24 | Connection |
| 24a | Connection valve |
| 25 | Second ring line |
| 25a | Flexible pipe |
| 26 | Drain line |
| 28 | First branching point |
| 30 | Circulation line |

-continued

| FIGS. 1 to 4 | |
|---|---|
| 32 | Delivery apparatus |
| 34 | Centrifugal separator |
| 36 | Filter apparatus |
| 38 | Control apparatus |
| 38a | Signal transmission line |
| 40 | Supply line |
| 41 | First supply line section |
| 42 | Second supply line section |
| 44 | Second branching point |
| 46 | Joining point |
| 48 | First shutoff valve |
| 50 | Second shutoff valve |
| 52 | Third shutoff valve |
| 54 | Fourth shutoff valve |
| 56 | Delivery apparatus |
| 56a | Screw conveyor |
| 56b | Drive motor |
| 56c | Storage tank |
| 60 | Moving apparatus |
| 70 | Pressing apparatus |
| 72 | Supports (for the pressing apparatus) |
| D | Insulation |
| D1 | Outer diameter |
| D2 | Inner diameter |
| G | Gaseous propellant/compressed gas - (air; nitrogen, inert gas) |
| H | Height |
| L | Air |
| $M_A$ | Drive motor (general) |
| ME1 | First mechanical energy |
| ME2 | Second mechanical energy |
| N1 | First free surface (first liquid level) |
| N2 | Second free surface (second liquid level) |
| P | Particles |
| Pr | Pressure |
| R1 | First rotary movement |
| S | Axis of symmetry |
| S1 | First flow |
| S2 | Second flow |
| S3 | Third flow |
| S4 | Fourth flow |
| T1 | First translatory movement |
| T2 | Second translatory movement |
| a to l, n | Signal connection |
| p | Gas pressure |
| r | Direction |

| FIG. 5 | | |
|---|---|---|
| | Superordinate terms | Special application: Production of tea concentrate |
| A | Primary solvent (before extraction) | Carrier material (before extraction) |
| A | Raffinate (=primary solvent after extraction) | Extracted tea leaves |
| $A^+$ | Raffinate with residual moisture | Extracted tea leaves with residual moisture |
| B | Transition component | Theine and other desirable and undesirable accompanying substances |
| C | Secondary solvent | Hot water or boiling Water |
| (A∞B) | Primary mixture | Tea leaves (tea raw material) |
| (A∞B) + C | Mixture of primary mixture and secondary solvent | Mixture of tea leaves and hot water |
| (C∞B) | Extract | Tea concentrate (filtered in the end step) |
| (C∞B)** | Extract freed from raffinate with residual moisture | Tea concentrate freed from extracted tea leaves with residual moisture |
| (C∞B)* | Pre-clarified extract | Pre-clarified tea concentrate |
| (C∞B) + A | Mixture (extract + raffinate after extraction) | Tea concentrate + extracted tea leaves |

-continued

FIG. 5

| | Superordinate terms | Special application: Production of tea concentrate |
|---|---|---|
| M | first mass (C) | first mass (hot water) |
| M' | First mass of extract freed from raffinate with residual moisture | First mass of tea concentrate freed from extracted tea leaves with residual moisture |
| ΔM | additional first mass (C) | additional first mass (hot water) |
| k1 | First concentration (second mass m of the primary mixture relative to the secondary solvent with the first mass M) →k1 = m/M | First concentration (second mass m of the tea leaves relative to the hot water with the first mass M) |
| k2 | Second concentration (second mass m of the primary mixture relative to the secondary solvent with the first mass M and the additional first mass ΔM) k2 = m/(M + ΔM) | Second concentration (second mass m of the tea leaves relative to the hot water with the first mass M and the additional first mass ΔM) |
| M | Second mass ((A∞B)) | second mass (tea leaves) |
| m' | Second mass of raffinate with residual moisture | Second mass of extracted tea leaves with residual moisture |
| Δt1 | First filling time (secondary solvent with first mass M) | First filling time (hot water with first mass M) |
| Δt2 | Second filling time (secondary solvent with additional first mass ΔM) | Second filling time (hot water with additional first mass ΔM) |
| Δt3 | Pressing time (raffinate with residual moisture) | Pressing time (extracted tea leaves with residual moisture) |
| τ1 | First dwell time | First brewing time |
| τ2 | Second dwell time | Second brewing time |

The invention claimed is:

1. A method for industrial production of an extract by solid-liquid extraction by means of an extraction container, the method comprising:

(a) bringing a primary mixture consisting of a solid primary solvent and a transition component into contact with a secondary solvent located in the extraction container for a predetermined dwell time to obtain the extract and a complementary portion of raffinate, wherein:

the extract comprises the secondary solvent and the transition component, the raffinate comprises the primary solvent and residual moisture, wherein the residual moisture comprises more of the extract, the extraction container is initially filled with a predetermined first mass of the secondary solvent, the primary mixture is enclosed in a liquid-permeable vessel within the extraction container and has a predetermined second mass, and step (a) comprises sub-steps of:

(i) one of:

first locating the vessel in the extraction container and then introducing the primary mixture into the vessel, or first filling the vessel with the primary mixture and then placing the vessel into the extraction container, (ii) moving the vessel within the extract container in a reciprocating first translational movement relative to the extraction container to enhance solid-liquid extraction during a first dwell time of the predetermined dwell time, (iii) circulating, by means of a circulation guide, at least one of the secondary solvent or the extract in the extraction container from a top of the extraction container to a bottom of the extraction container, and (iv) filling the extraction container with a predetermined additional first mass of the secondary solvent, without removing any extract from the extraction container, after the first dwell time, and continuing the solid-liquid extraction during a second dwell time of the predetermined dwell time, (b) separating the extract and the raffinate from each other after the predetermined dwell time, (c) after separation from the raffinate, discharging the extract from the extraction container, and (d) at least partially removing the residual moisture from the raffinate, after steps (b) and (c) have been completed, through dehumidification by mechanical pressing in the vessel, wherein the extract that was contained in the residual moisture and was obtained by dehumidification is supplied to the extract either after the extract is separated from the raffinate in step (b) or after the extract is discharged in step (c).

2. The method according to claim 1, wherein the dehumidification of step (d) starts at an earliest when a first part of the raffinate has dried out.

3. The method according to claim 1, wherein, after the extract has been separated from the raffinate, filtering the extract to remove undesirable particles, which undesirable particles pass through outlets in the vessel.

4. The method according to claim 3, wherein, for preliminary clarification before filtering and after the extract has been separated from the raffinate, separating the extract from the raffinate in a centrifugal field to form a pre-clarified extract.

5. The method according to claim 1, wherein, after the extract has been separated from the raffinate, an automatic or forced discharging of the extract occurs, wherein a gaseous propellant is applied to a surface of the extract inside the extraction container during the discharging of step (c).

6. The method according to claim 1, wherein the extraction container is designed as a homogeneous batch reactor.

7. The method according to claim 1, wherein the extract comprises a tea concentrate.

8. The method according to claim 1, wherein enhancing the solid-liquid extraction during the first dwell time in step (a) comprises, in sub-step (ii), at least one of:

generating a flow within the extraction container to at least partially move the secondary solvent or the extract in a targeted manner, or stirring up the primary mixture and keeping afloat the primary mixture by feeding at least one of the secondary solvent or the extract as an upwardly directed flow from a lower part of the vessel.

9. The method according to claim 1, wherein moving the vessel within the extract relative to the extraction container at sub-step (ii) also includes moving the vessel in a first rotational movement.

* * * * *